(12) United States Patent
Mikan

(10) Patent No.: US 11,796,359 B2
(45) Date of Patent: Oct. 24, 2023

(54) COMPACT ULTRASONIC FLOW METER WITH A FLOW PASSAGE FORMED THEREIN

(71) Applicant: OIL&GAS METERING EQUIPMENT S.R.O., Chrast u Chrudime (CZ)

(72) Inventor: Jaroslav Mikan, Chrast u Chrudime (CZ)

(73) Assignee: OIL&GAS METERING EQUIPMENT S.R.O., Chrast u Chrudime (CZ)

( * ) Notice: Subject to any disclaimer, the term of this patent is extended or adjusted under 35 U.S.C. 154(b) by 274 days.

(21) Appl. No.: 17/056,784

(22) PCT Filed: Mar. 7, 2020

(86) PCT No.: PCT/IB2020/051993
§ 371 (c)(1),
(2) Date: Nov. 19, 2020

(87) PCT Pub. No.: WO2020/188396
PCT Pub. Date: Sep. 24, 2020

(65) Prior Publication Data
US 2021/0207983 A1  Jul. 8, 2021

(30) Foreign Application Priority Data
Mar. 16, 2019  (CZ) .............................. CZ2019-161

(51) Int. Cl.
*G01F 1/66* (2022.01)
*G01F 1/667* (2022.01)

(52) U.S. Cl.
CPC .............. *G01F 1/662* (2013.01); *G01F 1/666* (2013.01); *G01F 1/667* (2013.01)

(58) Field of Classification Search
None
See application file for complete search history.

(56) References Cited

U.S. PATENT DOCUMENTS 4,325,262 A  4/1982 Meisser et al.
6,330,831 B1 * 12/2001 Lynnworth ............. G01F 1/662
73/861.28

(Continued)

OTHER PUBLICATIONS

International Search Report (PCT/ISA/210) dated Jun. 25, 2020, by the IB Patent Office as the International Searching Authority for International Application No. PCT/IB2020/051993.

(Continued)

*Primary Examiner* — Harshad R Patel
(74) *Attorney, Agent, or Firm* — Panitch Schwarze Belisario & Nadel LLP

(57) ABSTRACT

The compact ultrasonic flow meter, especially for gas, is formed by an n-hedron shaped body, wherein n is 6 to 24, with three or four longitudinal circular openings. The axis of the body is perpendicular to the axis of the gas pipe. The structural length of the body is standardized according to the length of mechanical gas meters and comprises two or three flow conditioning segments which serve to guide the flow between the individual longitudinal circular openings, in which at least two ultrasonic sensors are located, while the side covers close the body from the sides.

7 Claims, 4 Drawing Sheets

(56) References Cited

U.S. PATENT DOCUMENTS

2008/0066527 A1* 3/2008 Ajay .................... G08B 17/113
                                                    73/53.01
2017/0343398 A1   11/2017 Nakai et al.
2018/0066972 A1*  3/2018 Sawchuk .............. G01F 15/185
2018/0149504 A1   5/2018 Zipperer et al.
2020/0408579 A1* 12/2020 Schröter ................ G01F 1/662

OTHER PUBLICATIONS

Written Opinion (PCT/ISA/237) dated Jun. 25, 2020, by the IB Patent Office as the International Searching Authority for International Application No. PCT/IB2020/051993.

* cited by examiner

COMPACT ULTRASONIC FLOW METER WITH A FLOW PASSAGE FORMED THEREIN

TECHNICAL FIELD

The invention relates to a compact ultrasonic flow meter for measuring gases, in particular in the distribution of natural gas.

BACKGROUND ART

At present, natural gas distribution measurements are performed using mechanical gas meters, rotary and turbine, i.e. internal diameters from DN 40 through DN 150, sizes from G 16 through G 1000 and pressure classes PN 10/16/40 and ANSI 150/300. These measurement principles have been known for decades. Mechanical gas meters have certain advantages but also serious drawbacks.

The main disadvantages of turbine gas meters are:

Small measuring range 1: 20, i.e. $Q_{min}/Q_{max}$ ratio

Pressure shock sensitivity—it is possible to break the gas meter by quickly opening the valve when a pressure shock is generated They require correct operation, any failure to observe gas meter lubrication instructions will adversely affect their measurement accuracy and service life—the need for lubrication at appropriate intervals They cannot be used outside the measuring range given by $Q_{min}$ and $Q_{max}$—risk of damage to the gas meter They require optimum pressure and flow Dirt causes clogging of the bearings and thus greatly deteriorate the accuracy, possibly damaging the turbine wheel Turbine gas meters are difficult to use for DN 40, 50 and 80 internal pipe diameters The main disadvantages of rotary gas meters include:

Pressure shock sensitivity

High demands on correct installation to avoid stress; incorrect installation will cause pistons jamming and the gas meter becomes irreparably damaged They cannot be used outside the measuring range given by Qmin and Qmax-risk of damage to the gas meter They require optimum pressure and flow Dirt causes clogging of the bearings and greatly impaired accuracy High price of rotary gas meters DN 100 and DN 150

When the rotary gas meters are blocked, the gas flow is interrupted; it is necessary to use an integrated bypass, which further increases the cost of a rotary gas meter They cause pulsations in the piping For these reasons, efforts have been made to replace mechanical gas meters with ultrasonic ones for measuring natural gas in distribution. The aim is to preserve the advantages of mechanical gas meters and eliminate their drawbacks. So far there is no ultrasonic gas meter to meet these requirements. The main disadvantages of existing ultrasonic gas meters for natural gas distribution are listed below.

A smaller measuring range than the measuring range of rotary gas meters; if the typical measuring range of the most common size G 65 is 1:160, the typical measuring range of the G 65 ultrasonic gas meter is e.g. 1:50 (Qmin/Qmax ratio)

Minimum error of the ultrasonic gas meter is 1 percent, which is higher than with the new mechanical gas meters Ultrasonic gas meters for distribution are several times more expensive than mechanical gas meters Ultrasonic gas meters still require at least 2×DN straight section upstream of the gas meter Existing ultrasonic gas meters are susceptible to dirt and corrosion that cause the calibration curve to shift A flow conditioner must be placed upstream of the gas meter; there must be a straight section, usually 5×DN, between the flow conditioner and the gas meter The ultrasonic gas meter body is made of aluminium, and therefore the ultrasonic gas meter is not usable to replace turbine gas meters that are used in applications where a ductile cast iron/cast steel body is required Ultrasonic gas meters including flow conditioners incur higher pressure losses than rotary gas meters Ultrasonic gas meters that guide the flow vertically relative to the pipe axis are of considerable size and weight, making handling and installation difficult There are a number of design solutions for ultrasonic flow meters, the most widespread of which is to place the ultrasonic sensors into the pipe at a certain angle, while the gas flows at a certain velocity along the pipe axis. If a flow conditioner is used, it is installed at the inlet of the flow meter or into the piping upstream of the flow meter.

The principle of measurement of such flow meter is to measure the time of the transmitted ultrasonic signal between the sensors along a certain path. One ultrasonic signal is transmitted in the gas flow direction and is therefore accelerated by the gas flow velocity vector, and hence the time $t_1$ is shorter. The second ultrasonic signal is transmitted against the gas flow direction; it is decelerated by the gas flow velocity vector, and hence the time $t_2$ is longer. The volume flow rate is then calculated from the time difference $\Delta t = t_2 - t_1$.

In order to make the measurement of the times $t_1$ a $t_2$ more accurate, it is preferred that the distance between the sensors is as long as possible. This can be achieved by reducing the angle $\alpha$ but at the expense of increasing the total length of the flow meter. These flow meters have a larger structural length L, i.e. the distance between flanges, than are structural lengths of mechanical flow meters. Furthermore, a certain straight section upstream and downstream the flow meter is required.

Mechanical gas flow meters, i.e. gas meters used for metering and billing the natural gas consumption, have a standard structural length L in case of turbine gas meters—distance between flanges, which is three times the nominal internal diameter DN of the gas meter, i.e. L=3DN. For rotary gas meters, these lengths are defined at 150, 171, 241, 260 mm, etc., depending on the gas meter internal diameter. If the length L of the gas meter is greater than the standard, this significantly increases the installation cost when a mechanical gas meter is being replaced by ultrasonic one. In order to maintain the standardized structural length L, the ultrasonic flow meter must be designed so that the gas flows through a modified body, i.e. not along the pipeline axis, and the location of ultrasonic sensors is also off the pipeline axis.

SUMMARY OF INVENTION

The above drawbacks are largely overcome by the compact ultrasonic flow meter, especially for gas, of the present invention. It is the object of the invention to provide a new design of compact ultrasonic flow meter so that the flow meter structural length L equal to that of mechanical gas meters is maintained. The compact ultrasonic flow meter, especially for gas, consists of a compact body in the form of an n-hedron, where n is 6 to 24, usually a prism, and is provided with at least three longitudinal circular openings, wherein the body length is standardized according to the length of mechanical gas meters. The axis of the body and thus of the longitudinal circular openings is perpendicular to the axis of the gas pipe. A plurality of flow conditioners may be provided in the body, the individual longitudinal circular openings in the body being interconnected by flow conditioning segments. In one longitudinal circular opening there is a measuring section where the ultrasonic sensors are located.

The signal between the ultrasonic sensors may be directed straight and/or at an angle and/or with reflection against the wall of the longitudinal circular opening. The flow conditioner is preferably located within the inside of the longitudinal circular opening and/or the flow conditioning segment so that it is integrated into the gas flow. The body may be made of a material selected from the group consisting of aluminium alloy, special ductile iron and steel. The inside of the longitudinal circular openings is protected by a surface resistant to dirt and corrosion. The body's structural length is standardized according to the structural length of mechanical gas meters selected from the group consisting of turbine gas meters and rotary gas meters. The flow conditioner may be located in the longitudinal circular opening and/or in the flow conditioning segment and is designed so that the ultrasonic flow meter does not require straight pipe sections upstream/downstream of the flow meter. The ultrasonic sensors are positioned at an angle to the axis of the opening, and at the same time it is possible to position the sensors at an angle so that the ultrasonic signal is reflected against the wall of the longitudinal circular opening. This solution has the advantage of a better evaluation of the velocity profile, which results in higher accuracy and larger measuring range.

The main advantages of the compact ultrasonic flow meter according to the proposed solution are given below.

The price of the ultrasonic flow meter according to the invention is comparable to the price of mechanical, rotary and turbine, gas meters The structural length and material of the connecting fitting and the ultrasonic flow meter body are the same as the material of mechanical gas meters, rotary and turbine, thus allowing easy replacement of mechanical gas meters with the ultrasonic ones.

The ultrasonic flow meter according to the invention does not require a straight pipe section upstream and downstream of the flow meter.

The ultrasonic flow meter is battery powered with a battery life of minimally 5 years Maximum ultrasonic flow meter error is ±0.5 percent; this error does not increase over the period of use. This smaller error is achieved with a higher number of ultrasonic sensors. The ultrasonic sensors are positioned at an angle along the axis of the longitudinal circular opening and/or the ultrasonic sensors are positioned so that signals reflect against the walls of the longitudinal circular opening for better evaluation of the velocity profile, which increases accuracy and measuring range.

Measuring range of the ultrasonic flow meter is 1:100 and better, which is significantly higher than that of turbine and existing ultrasonic gas meters.

The inside of the flow meter, i.e. the longitudinal circular openings, is protected against corrosion and contamination, which means that the calibration curve does not shift as with other ultrasonic gas meters.

It is not possible to destroy the flow meter with a pressure shock as with mechanical gas meters.

The flow meter is tolerant to faults during installation, maintenance and operation, i.e. incorrect installation will not jam the pistons, see the rotary gas meters; incorrect lubrication will not impair accuracy, measuring range or even destroy the gas meter, see the rotary and turbine gas meters; operation outside the specified Qmin and Qmax will not impair the measuring properties of the gas meter and will not lead to its destruction, see the rotary and turbine gas meters.

The flow meter has no moving parts, which significantly increases its reliability compared to mechanical gas meters.

This ultrasonic flow meter is the first existing compact-type ultrasonic flow meter capable of replacing mechanical rotary and turbine gas meters because it retains all their advantages and eliminates all their drawbacks, all at the same or better cost as mechanical gas meters. Its small size and weight make it easy to transport and install.

BRIEF DESCRIPTION OF DRAWINGS

The compact ultrasonic flow meter of the present invention is described in more detail with reference to the accompanying drawings, wherein.

EXAMPLES OF EMBODIMENTS OF THE INVENTION

Variant A

Figure 1:
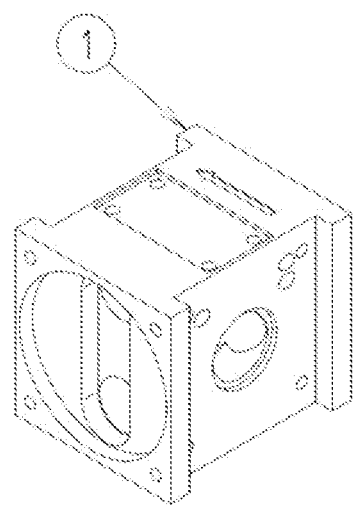
FIG. 1 is an exemplary compact ultrasonic flow meter, especially for gas, shown in an axonometric view.
Figure 1A:
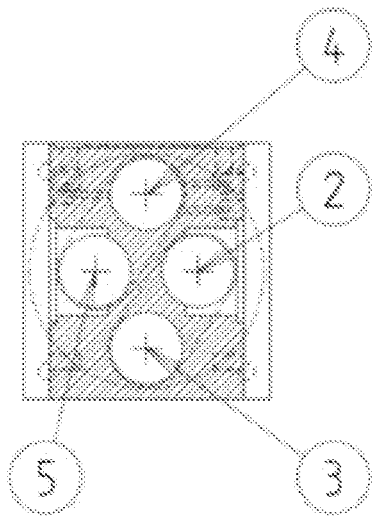
FIG. 1a shows the flow meter in section.
Figure 2:
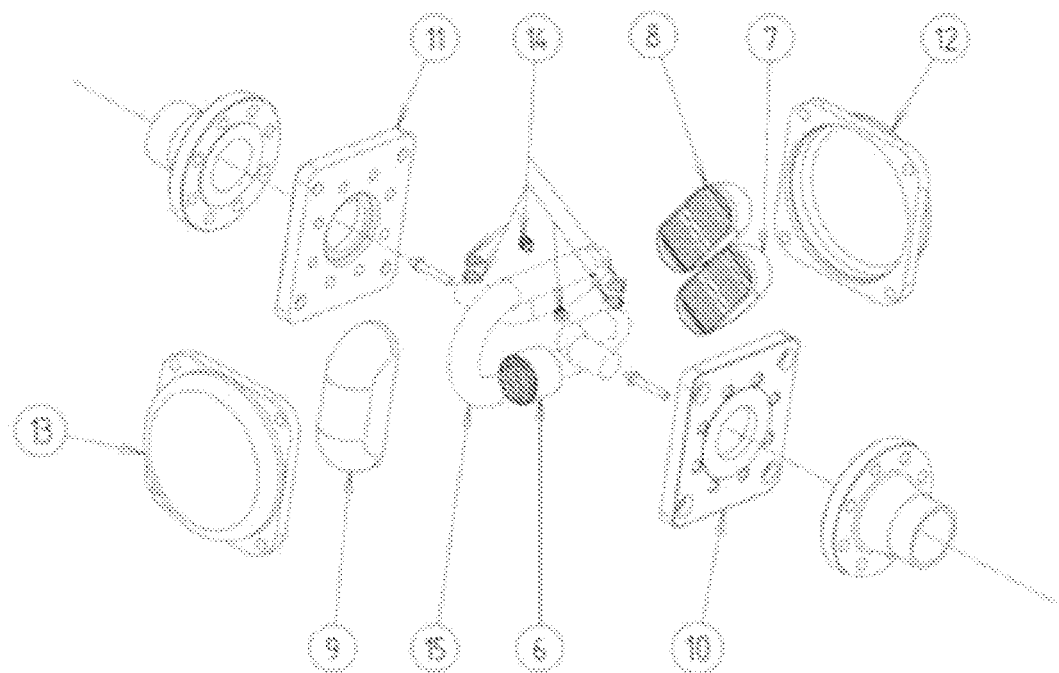
FIGS. 2 to 4 show the compact ultrasonic flow meter, especially for gas, in an exploded axonometric view.

The exemplary compact ultrasonic flow meter shown in consists of a hexagonal prism body 1 with four longitudinal circular openings 2, 3, 4 and 5; a flow conditioner 6; three flow conditioning segments 7, 8 and 9; an inlet flange 10; an outlet flange 11; side covers 12 and 13; and ultrasonic sensors 14 as shown in FIGS. 1, 1a, 2 and 4. The gas flows through the inlet flange 10 and enters the centre of the body 1, is guided into the longitudinal circular opening 2 and further to the periphery of the body 1, where it is guided by the flow conditioning segment 7 to the longitudinal circular opening 3, where the flow conditioner 6 is installed, it is further guided to the periphery of the body 1, where it is guided through the flow conditioning segment 9 into the longitudinal circular opening 4, where the measuring section is located and ultrasonic sensors 14 are positioned. The ultrasonic signal between the sensors 14 is transmitted directly from sensor to sensor or by reflection against the walls of the longitudinal circular opening 4 in the body 1. Each ultrasonic sensor 14 is simultaneously a transmitter and a receiver. Further, the flow is guided through the flow conditioning segment 8 into the longitudinal circular opening 5 and exits through the outlet flange 11. Side covers 12 and 13 are mounted on the sides of the body 1. All four longitudinal circular openings 2, 3, 4 and 5 are located in the body 1 above and next to each other, so as to achieve compact dimensions and low weight. The direction of gas flow through the body 1 is shown by the position 15.

Variant B—without the Flow Conditioner

Figure 3:
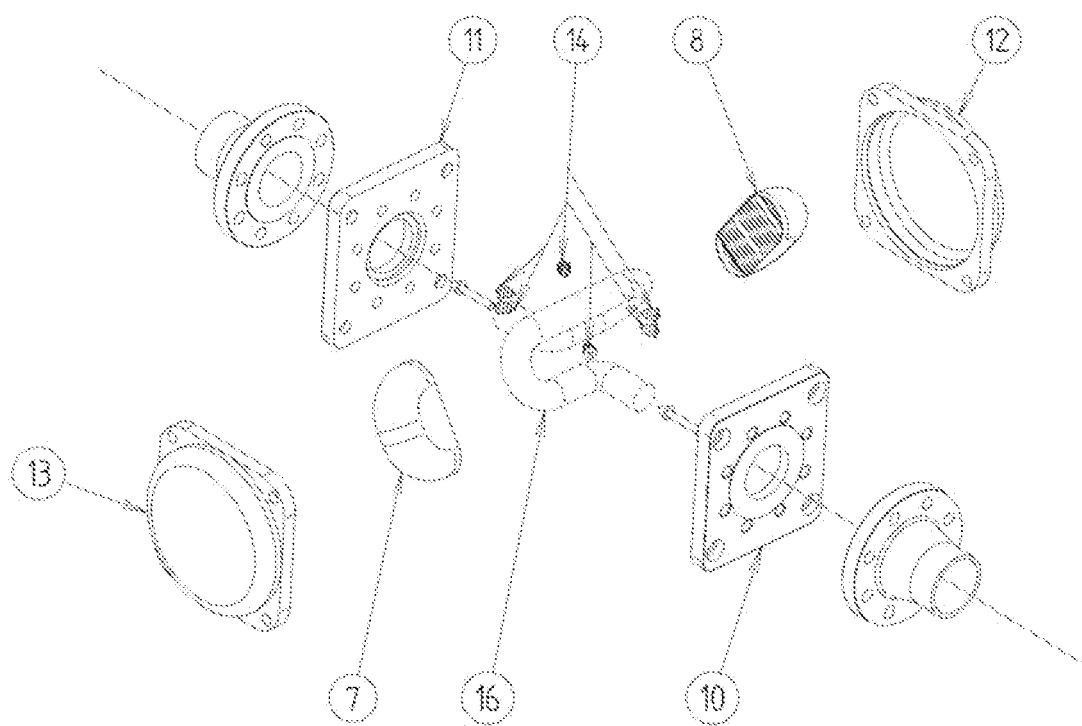
Figure 4:
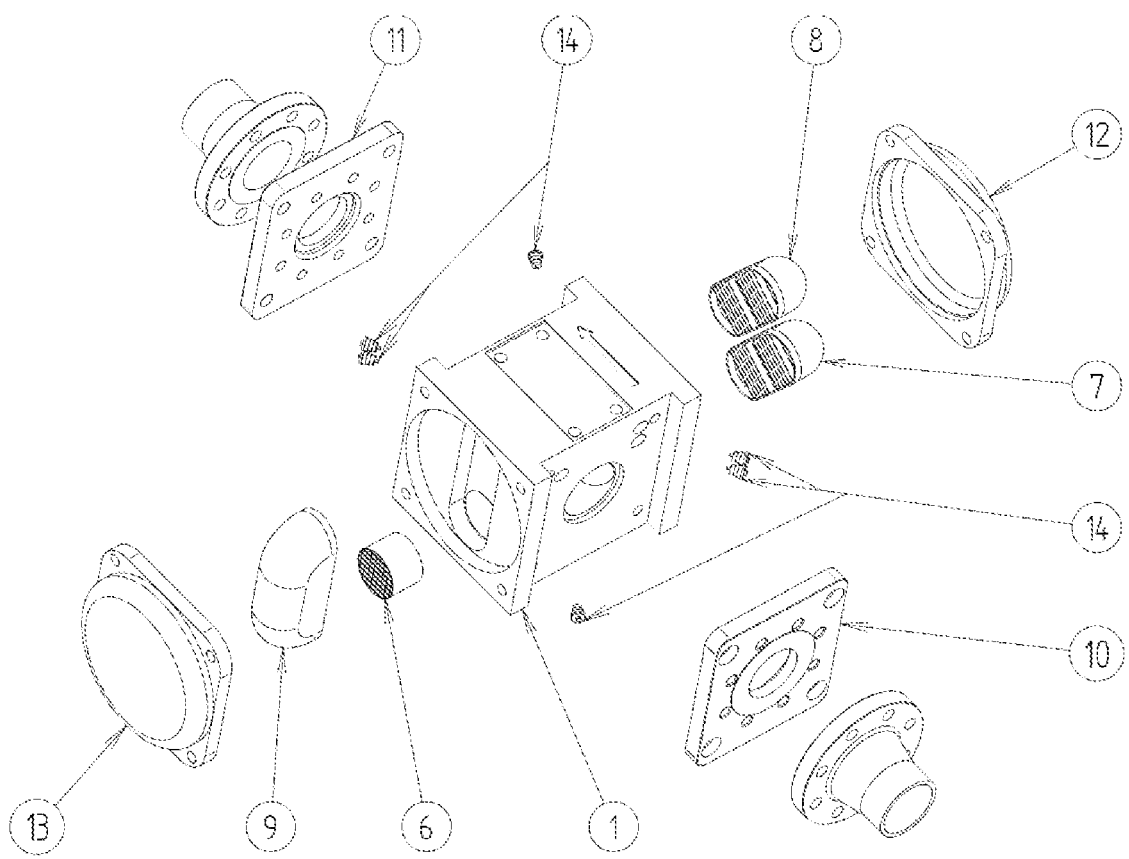

The exemplary compact ultrasonic flow meter shown in FIG. 3 consists of a body (similar to body 1 of FIG. 1) with three longitudinal circular openings (not depicted), two flow conditioning segments 7 and 8, an inlet flange 10, an outlet flange 11, side covers 12 and 13 and ultrasonic sensors 14. The gas flows through the inlet flange 10, is guided into a first longitudinal circular opening (not depicted) and to a periphery of the body, where it is guided through the flow conditioning segment 7 into a second longitudinal circular opening (not depicted), where the measuring section is located and ultrasonic sensors 14 are positioned. The ultrasonic signal between the sensors 14 is transmitted directly from sensor to sensor or by reflection against the walls of the second longitudinal circular opening not depicted). Each ultrasonic sensor 14 is simultaneously a transmitter and a receiver. Further, the flow is guided through the flow conditioning segment 8 into a third longitudinal circular opening (not depicted) and exits through the outlet flange 11. Side covers 12 and 13 are mounted on the sides of the body not depicted). All three longitudinal circular openings (not depicted) are located in the body above and next to each other, so as to achieve compact dimensions and low weight. The direction of gas flow through the body is shown by the position 16.

Both variants A and B can be used both in horizontal and vertical versions.

| Ultrasonic gas flow meters made of aluminium | Structural length |
| --- | --- |
| DN 40 PN 10/16 and ANSI 150 | 150/171 mm |
| DN 50 PN 10/16 and ANSI 150 | 150/171 mm |
| DN 80 PN 10/16 and ANSI 150 | 171/241 mm |
| DN 100 PN 10/16 and ANSI 150 | 241 mm |
| DN 150 PN 10/16 and ANSI 150 | 260 mm |
| DN 40/50 PN 40 and ANSI 300 etc. | 240 mm |

| Ultrasonic gas flow meters made of steel and cast iron | Structural length |
| --- | --- |
| DN 50 PN 10/16 and ANSI 150 | 150/171 mm |
| DN 80 PN 10/16 and ANSI 150 | 171/240 mm |
| DN 100 PN 10/16 and ANSI 150 | 241/300 mm |
| DN 150 PN 10/16 and ANSI 150 | 450 mm |
| DN 50 PN 40 and ANSI 300 | 150/240 mm |
| DN 80 PN 40 and ANSI 300 | 240/273 mm |
| DN 100 PN 40 and ANSI 300 | 300 mm |
| DN 150 PN 40 and ANSI 300 etc. | 450 mm |

INDUSTRIAL APPLICABILITY

The compact ultrasonic gas flow meter according to the invention will find application primarily in gas measurement, especially in the distribution of natural gas in households, commercial buildings and the like

The invention claimed is:
1. An ultrasonic compact flow meter, comprising:
a body including an inlet flange and an outlet flange and having a length between the inlet flange and the outlet flange corresponding to a length of standardized mechanical gas meters,
wherein the body further includes at least two flow conditioning segments forming a measuring section between the inlet flange and the outlet flange of the body through which a medium flows;
wherein the body (i) is in a shape of an n-hedron, where n is 6 to 24, and (ii) defines at least three longitudinal circular openings that are interconnected by said at least two flow conditioning segments, said at least two flow conditioning segments guiding a flow of the medium between individual longitudinal circular openings of the at least three longitudinal circular openings,
wherein the body further includes at least two ultrasonic sensors located within the measuring section of one longitudinal circular opening of the at least three longitudinal circular openings,
wherein the at least three longitudinal circular openings are connected to the inlet flange and the outlet flange, and
wherein the at least two flow conditioning segments are covered by side covers connected to the body.

2. The compact ultrasonic flow meter according to claim 1, wherein the ultrasonic sensors are configured to guide a signal at an angle and/or with reflection against walls of the measuring section.

3. The compact ultrasonic flow meter according to claim 1, wherein inside at least one longitudinal circular opening and/or flow conditioning segment, a flow conditioner is provided integrated into the flow of the medium.

4. The compact ultrasonic flow meter according to claim 1, wherein an inner side of the longitudinal circular openings is provided with a surface finish resistant to corrosion and contamination.

5. The compact ultrasonic flow meter according to claim 1, wherein the body is made of a material selected from the group consisting of aluminum alloy, ductile iron and steel.

6. The compact ultrasonic flow meter according to claim 1, wherein the body is made by extrusion and/or drawing technology.

7. The compact ultrasonic flow meter according to claim 1, wherein a structural length of the body is standardized according to a structural length of mechanical gas meters selected from a group including turbine gas meters and rotary gas meters.

* * * * *